(12) United States Patent
Chyou et al.

(10) Patent No.: US 8,894,736 B2
(45) Date of Patent: Nov. 25, 2014

(54) GAS DISTRIBUTOR FOR GRANULAR MOVING-BED FILTER

(75) Inventors: Yau-Pin Chyou, Taipei (TW); Jiri Smid, Prague (CZ); Po-Chuang Chen, Taoyuan County (TW); Yi-Shun Chen, Taoyuan County (TW); Shu-Che Li, Taoyuan County (TW); Shu-San Hsiau, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 328 days.

(21) Appl. No.: 13/446,062

(22) Filed: Apr. 13, 2012

(65) Prior Publication Data

US 2013/0098480 A1 Apr. 25, 2013

(30) Foreign Application Priority Data

Oct. 21, 2011 (TW) .............................. 100138300 A

(51) Int. Cl.
| | | |
|---|---|---|
| *B01D 46/00* | (2006.01) | |
| *F23J 15/02* | (2006.01) | |
| *B01D 45/08* | (2006.01) | |
| *B01D 46/34* | (2006.01) | |
| *B01D 46/32* | (2006.01) | |

(52) U.S. Cl.
CPC ............... *F23J 15/025* (2013.01); *B01D 45/08* (2013.01); *B01D 46/34* (2013.01); *B01D 46/0075* (2013.01); *B01D 46/32* (2013.01); *B01D 46/0053* (2013.01); *F23J 2217/105* (2013.01); *F23J 2217/20* (2013.01); *F23J 2217/30* (2013.01)

USPC .................. 55/495; 55/300; 55/400; 55/428; 55/462; 55/474

(58) Field of Classification Search
CPC .......... B01D 46/0053; B01D 46/0075; B01D 46/32; B01D 46/34; B01D 46/38; B01D 45/08; B01D 53/08
USPC ........... 55/300, 351, 462, 474, 495, 400, 428; 95/109; 96/150
See application file for complete search history.

(56) References Cited

U.S. PATENT DOCUMENTS

| | | | | |
|---|---|---|---|---|
| 2,181,232 | A * | 11/1939 | Haag .............................. | 266/157 |
| 4,221,573 | A * | 9/1980 | Hankins .......................... | 96/35 |
| 5,722,113 | A * | 3/1998 | Baziuk ............................ | 15/352 |
| 7,708,803 | B2 * | 5/2010 | Berry et al. ....................... | 95/59 |
| 8,052,766 | B2 * | 11/2011 | Varner et al. ..................... | 55/300 |
| 8,491,711 | B2 * | 7/2013 | Hsiau et al. ....................... | 96/150 |
| 2010/0104487 | A1 * | 4/2010 | Smid et al. ...................... | 422/213 |

FOREIGN PATENT DOCUMENTS

TW      I337889      3/2011

\* cited by examiner

*Primary Examiner* — Robert Clemente
(74) *Attorney, Agent, or Firm* — WPAT, PC; Justin King

(57) ABSTRACT

A gas distributor for a granular moving-bed filter comprises a distribution module, arranged inside a granular moving-bed filter. The distribution module comprises at least one flow-distributing curtain to be used for allowing a turbulent gas flow with dust mixed therein to flow therethrough, resulting that before the turbulent gas flow enters the granular moving-bed filter, the turbulent gas flow is transformed into a more uniformly distributed gas flow and the dust contained therein are partially filtered out.

16 Claims, 14 Drawing Sheets

GAS DISTRIBUTOR FOR GRANULAR MOVING-BED FILTER

FIELD OF THE INVENTION

The present invention relates to a gas distributor for granular moving-bed filter, and more particularly, to a gas distributor for processing a turbulent gas flow containing ash or dust before entering the granular moving-bed filter so that the turbulent gas flow can become more uniformly distributed while the ashes or dust contained therein can be partially filtered out.

BACKGROUND OF THE INVENTION

Coal-fired thermal power plants or incineration plants generate high-temperature gas containing a large amount of fly ash (dust), sulfides, nitrides or other contaminants, and if the exhaust flue gas or raw synthesis gas is emitted without processing, the environment of our world will be affected seriously.

According to foregoing mentioned problems, the industrial countries have to determine strict emission standards, and meanwhile, also have to input considerable research and development (R&D) resources to investigate how to remove the harmful pollutants in the gas streams effectively so as to conform to the strict emission standards.

In the issue of removing dust particulates or multi-contaminants from a dirty gas, a granular moving-bed filter is usually utilized to achieve by introducing the contaminated gas to pass through a granular moving-bed filter, which allows filter granules to flow slowly there inside. The collection mechanism of dust particulates of the granular moving bed filter is carried out by sending the contaminated gas to flow passing through a curtain formed by filter granules inside the granular moving-bed filter so as to leave the dust particulates and the multi-contaminants with the filter granules, and finally fleeing the gas with a substantial clean state out of the granular moving bed filter while also allowing the filter granules that are saturated with multi-contaminants to be drained out of the granular moving bed filter. In the art, the more detailed description relating to the granular moving bed filter can be obtained from TW Pat. No. 1337889.

However, since the contaminated gas is, in most case, not uniformly distributed while being fed into and flow inside a granular moving-bed filter, it is common that the majority of the contaminated gas will concentrate to flow through a certain part of the granular moving-bed filter while allowing the other part of the granular moving-bed filter to receive only a minute portion of the contaminated gas, and thereby, the part of the granular moving-bed filter where the majority of the contaminated gas is concentrated will be much more easily to be clogged by dust and contaminants contained in the contaminated gas comparing with the other parts, and eventually the flow of the contaminated gas will be blocked in a way that the filtration efficiency of the granular moving-bed filter will be severely affected.

Therefore, it is in need of an apparatus capable of enabling a turbulent gas flow to become a more uniformly distributed gas flow before the gas flow is allowed to enter a granular moving-bed filter.

SUMMARY OF THE INVENTION

In view of the disadvantages of prior art, the primary object of the present invention is to provide a gas distributor comprising a distribution module designed to be arranged inside a granular moving-bed filter and used for allowing a turbulent gas flow having dust mixed therein to flow therethrough, resulting that before the gas flow enters the granular moving-bed filter, the turbulent gas is transformed into a more uniformly distributed gas flow while the dust contained therein is partially filtered out, and thereby, capable of preventing dust or contaminants from being concentratedly deposited at certain inlets of the granular moving-bed filter and eventually clogging the inlets. Moreover, the distribution module is further configured with a vibrator, that is used for stripping off the dust or contaminants that are attached and adhered to the distribution module so that the dust or contaminants can be separated from the distribution module, and thus enabling the distribution module to be cleaned by the vibration of the vibrator without stopping the operation of the distribution module when the inlets of the granular moving-bed filter are clogged by dust.

To achieve the above object, the present invention provides a gas distributor for a granular moving-bed filter having an inlet disposed at a side thereof and an outlet disposed at the other side thereof, that the gas distributor comprises: a distribution module configured with a support, at least one flow-distributing curtain, a vibrator and a dust hopper. The support, being formed with a top and a bottom, is mounted on the granular moving-bed filter at a position close to the inlet. The at least one flow-distributing curtain comprises at least one flow-through area. The vibrator is disposed at the top of the support and the dust hopper is arranged beneath the flow-distributing curtain.

To sum up, the gas distributor has the following advantages:

(1) By arranging at least one flow-distributing curtain in the distribution module, any turbulent gas flow having dust mixed therein can be transformed into a more uniformly distributed gas flow while enabling the dust contained therein to be preliminarily filtered out before being fed into the inlet, and thereby, preventing dust or contaminants from being densely deposited at the inlet of the granular moving-bed filter and eventually clogging the inlet.

(2) Since there can be more than one flow-distributing curtains to be arranged in the distribution module while enabling the flow-through areas of any two neighboring flow-distributing curtains to have staggered and parallel arrangement, any turbulent gas flow having dust mixed therein can be transformed into a more uniformly distributed gas flow after flowing through the plurality of flow-distributing curtains. In addition, as the flow-through areas of any two neighboring flow-distributing curtains are parallel and are arranged in staggered manner, dust contained in the gas flow can be filtered multiple times.

(3) As the flow-distributing curtains can be induced to vibrate longitudinally and transversely, any dust or contaminants that are attached and adhered to the flow-distributing curtains or the corresponding flow-through areas can be stripped off such that the distribution module can be cleaned.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitation of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
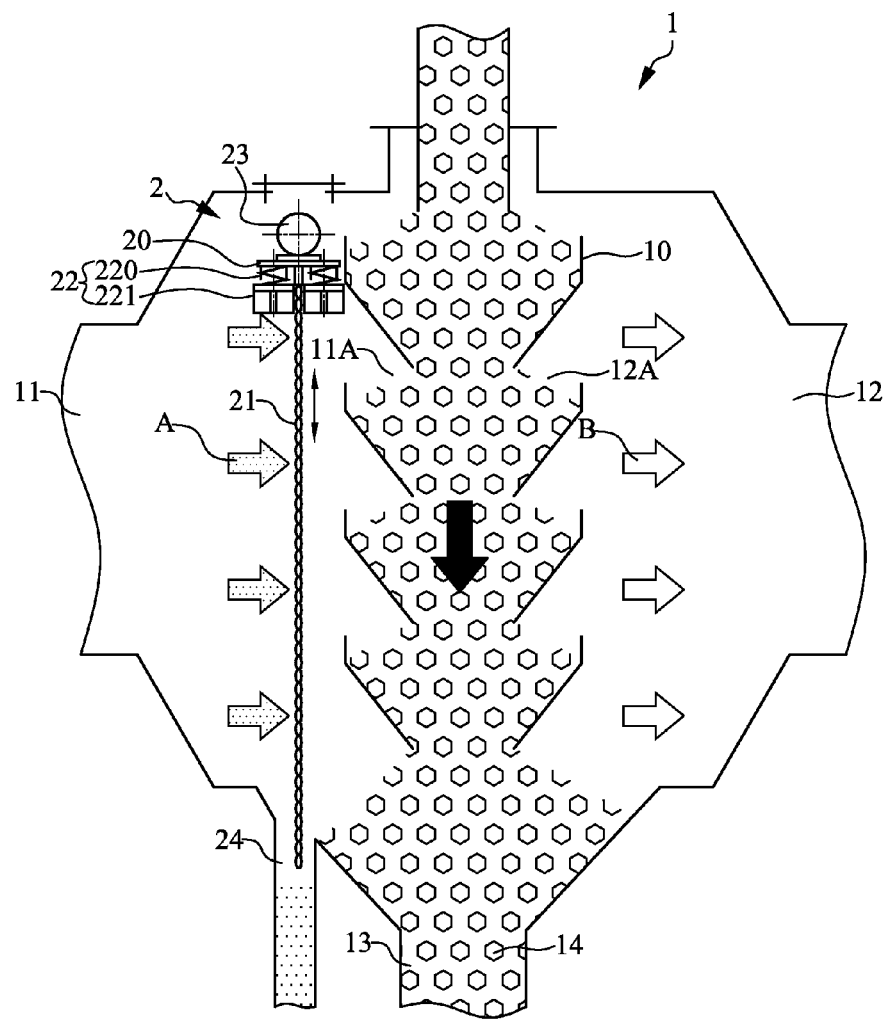
FIG. 1 is a schematic diagram showing a gas distributor for a granular moving-bed filter according to a first embodiment of the invention.

Please refer to FIG. 1, which is a schematic diagram showing a gas distributor for a granular moving-bed filter according to a first embodiment of the invention. As shown in FIG. 1, a gas distributor is adapted for a granular moving-bed filter 1, which comprises: an inlet 11 disposed at a side of the granular moving-bed filter for allowing a dust-containing gas flow A passing therein, an outlet 12 disposed at another side of the granular moving-bed filter 1, and a plurality of hopper structures 10 longitudinally arranged and stacked inside the granular moving-bed filter 1 while being in communication with each other for forming a longitudinal channel 13 having filter granules 14 flowing therethrough. Moreover, each hopper structure 10 in the granular moving-bed filter 1 is configured with at least one inlet 11A at a side corresponding to the inlet 11 and at least one outlet 12A at a side corresponding to the outlet 12.

In addition, the gas distributor has a distribution module 2, which comprises: a support 20, at least one first flow-distributing curtain 21, at least one first damper 22, a vibrator 23 and a first dust hopper 24, wherein the support 20 is arranged at a position between the inlets 11A and the inlet 11, and the support 20 has a top and a bottom.

Figure 2:
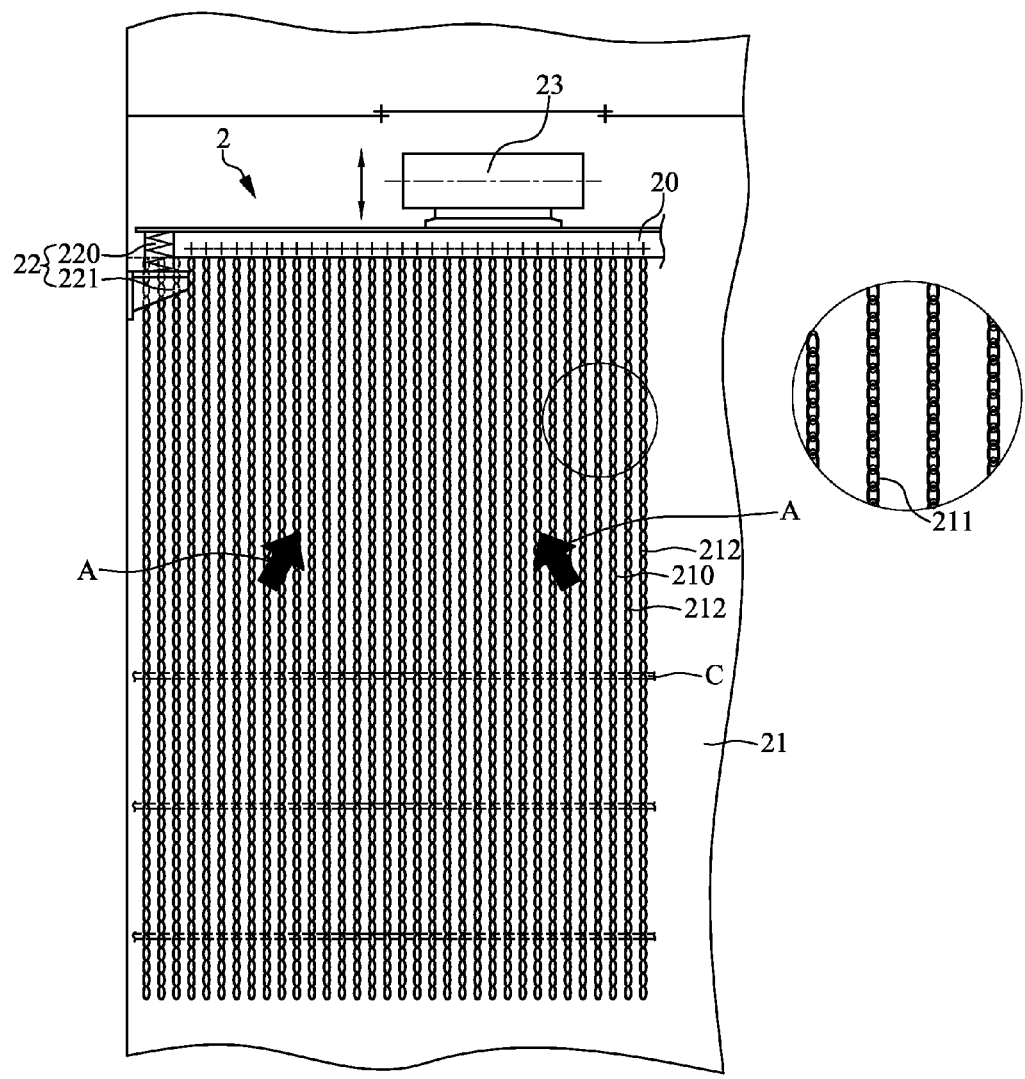
FIG. 2 is a schematic diagram showing a flow-distributing curtain used in the gas distributor of the first embodiment of the invention.

Please refer to FIG. 2, which is a schematic diagram showing a flow-distributing curtain used in the gas distributor of the first embodiment of the invention. As shown in FIG. 2, the first flow-distributing curtain 21 is composed of a plurality of chains 210 and each chain 210 is composed of a plurality of serially connected links 211. Moreover, in this embodiment, the hollow part of each link 211 is formed to be one flow-through area 212 and also each gap formed between any two neighboring chains 210 is formed as one flow-through area 212. Thus, it can be concluded that each of the at least one first flow-distributing curtain 21 is formed with at least one flow-through area 212, and each of the first flow-distributing curtain 21 is arranged at the bottom of the support 20, as shown in FIG. 2.

Moreover, each first flow-distributing curtain 21 is further configured with at least one adjusting rod C that is arranged transversely to the plurality of chains 210 of the first flow-distributing curtain 21 for allowing the plurality of chains 210 to be coupled thereat. It is noted that no matter the coupling of each chain 210 on the adjusting rod C is achieved by attaching the chain 210 on the rod C or by piecing the rod C through the hollow part of the chain 210, the arrangement of the adjusting rod C is used for reducing the swing amplitude of the chains 210 of the first flow-distributing curtain 21 when the first flow-distributing curtain 21 is being blown by the dust-containing gas flow A.

In FIG. 2, the first damper 22, being arranged at the bottom of the support 20 on at least one side thereof, comprises a first seat 221 and an elastic member 220, wherein an end of the elastic member 220 is engaged to the support 20 while another end of the elastic member 220 is abut against the first seat 221.

In this embodiment, the vibrator 23 is arranged at the top of the support 20 so as to induce the first flow-distributing curtain 21 to vibrate in a longitudinal direction that is perpendicular to the blowing direction of the dust-containing gas flow A. In addition, the first dust hopper 24 is disposed at a position beneath the first flow-distributing curtain 21.

The following description relates to a second, a third and a fourth embodiment of the present invention. However, as they are different from the first embodiment only in the structure of the flow-distributing curtain, the description along with the corresponding drawings of those embodiments will focus on the structure of the flow-distributing curtain without distinguishing the different flow-distributing curtains by a sequence of a first flow-distributing curtain, a second flow-distributing curtain, and so on.

Figure 3:
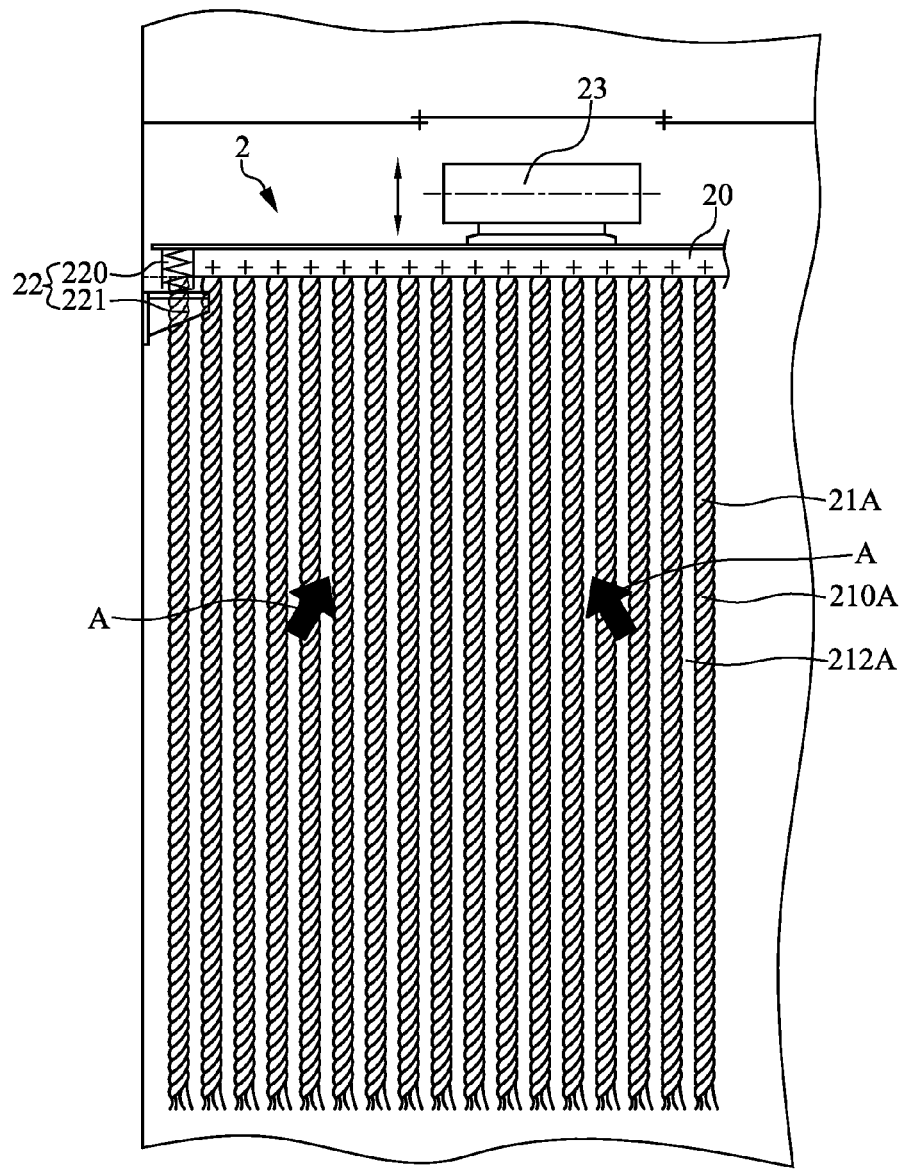
FIG. 3 is a schematic diagram showing a flow-distributing curtain used in a gas distributor of a second embodiment of the invention.

Please refer to FIG. 3, which is a schematic diagram showing a flow-distributing curtain used in a gas distributor of a second embodiment of the invention. In this second embodiment, the flow-distributing curtain 21A is composed of a plurality of ropes 210A while allowing a flow-through area 212A to be formed between any two neighboring ropes 210A, resulting that the flow-distributing curtain 21A is formed with a plurality of flow-through areas 212A.

Figure 4:
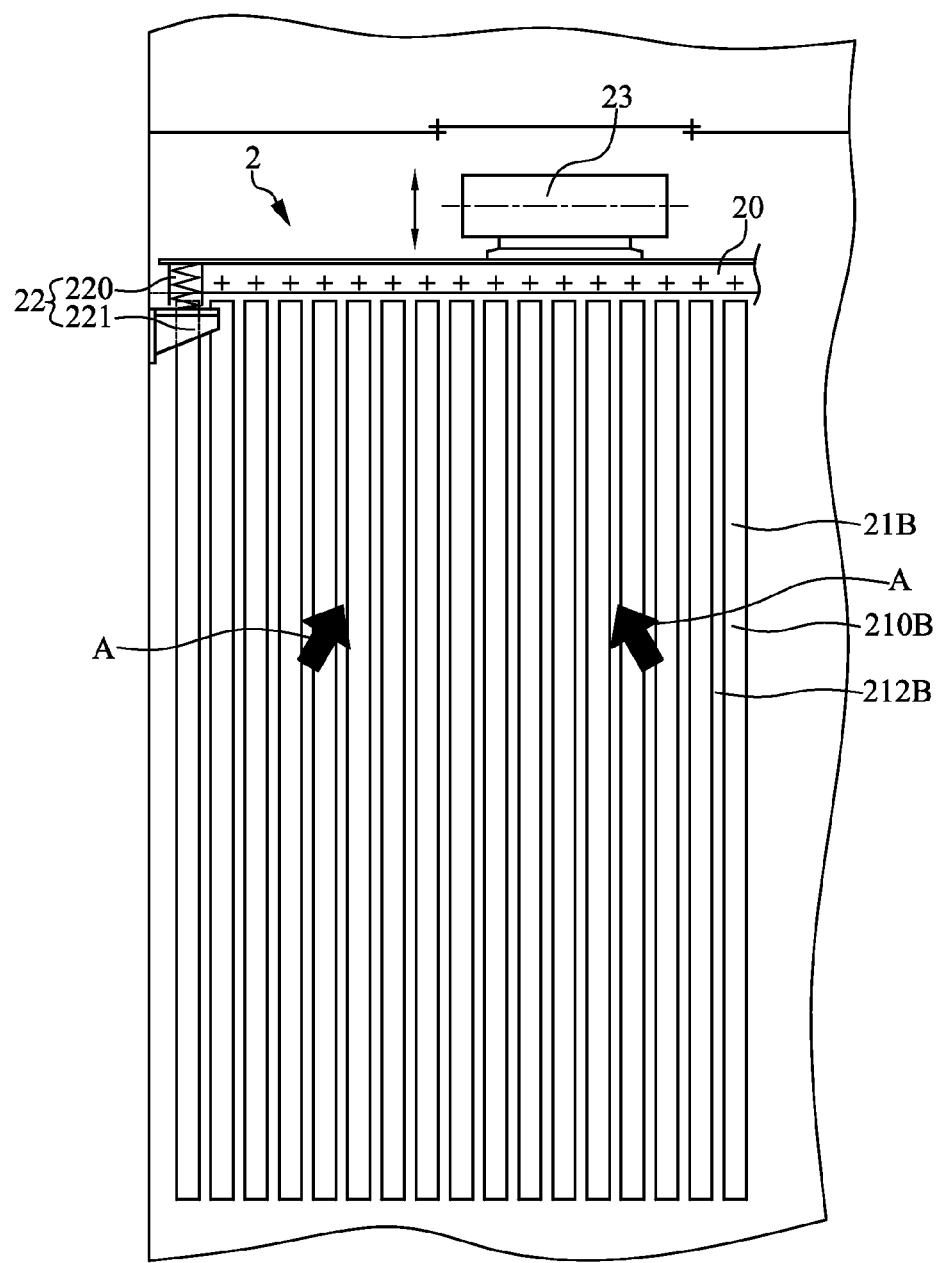
FIG. 4 is a schematic diagram showing a flow-distributing curtain used in a gas distributor of a third embodiment of the invention.

Please refer to FIG. 4, which is a schematic diagram showing a flow-distributing curtain used in a gas distributor of a third embodiment of the invention. In this third embodiment, the flow-distributing curtain 21B is composed of a plurality of bar-like elements 210B while allowing a flow-through area 212B formed between any two neighboring bar-like elements 210B, resulting that the flow-distributing curtain 21B is formed with a plurality of such flow-through areas 212B. Moreover, each bar-like element 210B is an object selected from the group consisting of: a long strip-like object, a rod-like object, a long strip-like object of any geometrical shape, and a rod-like object with any geometrical shape. It is noted that all the aforesaid ropes and bar-like element provided in the foregoing embodiments should be capable of coupling itself with the adjusting rod.

Figure 5:
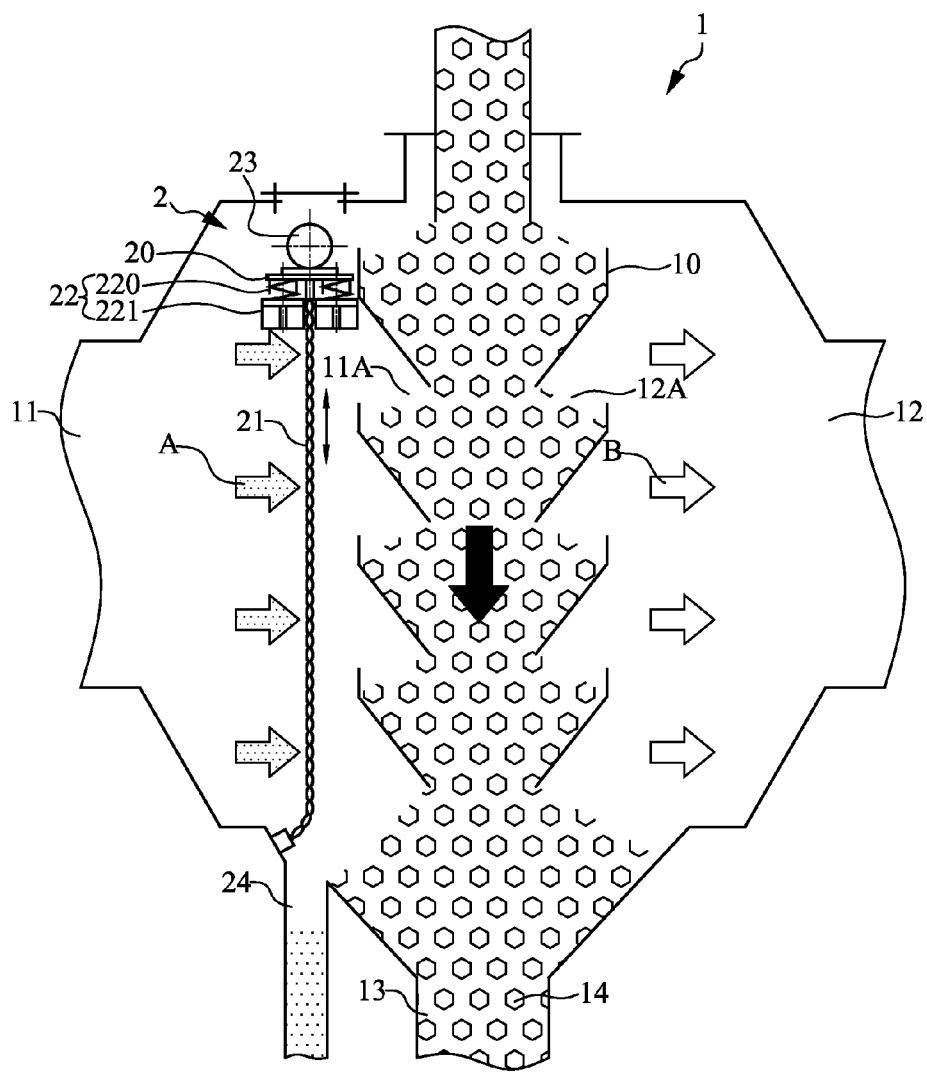
FIG. 5 is a schematic diagram showing a gas distributor for a granular moving-bed filter according to a fourth embodiment of the invention.

Please refer to FIG. 5, which is a schematic diagram showing a gas distributor for a granular moving-bed filter according to a fourth embodiment of the invention. The gas distributor of the fourth embodiment is structured based upon the first embodiment, and thus its components are numbered the same as those disclosed in the first embodiment. The gas distributor of the fourth embodiment is different from the first embodiment in that: instead of hanging freely, the tail of the first flow-distributing curtain 21 is connected to the first dust hopper 24.

Figure 6:
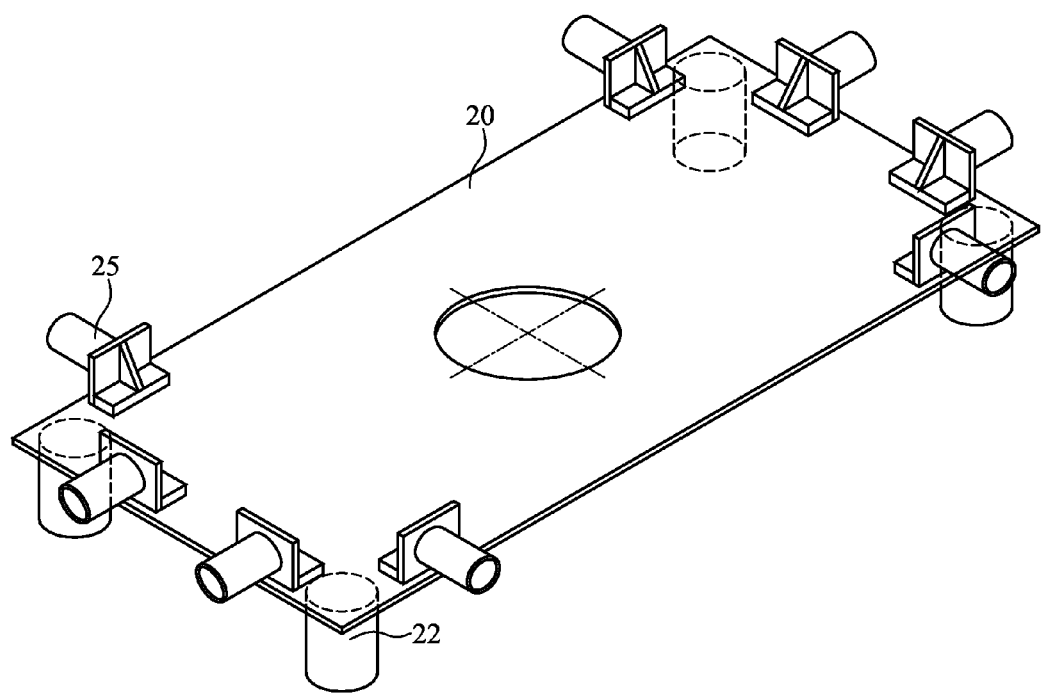
FIG. 6 is a schematic diagram showing a gas distributor of a fifth embodiment of the invention relating to how the dampers are arranged thereat.
Figure 7:
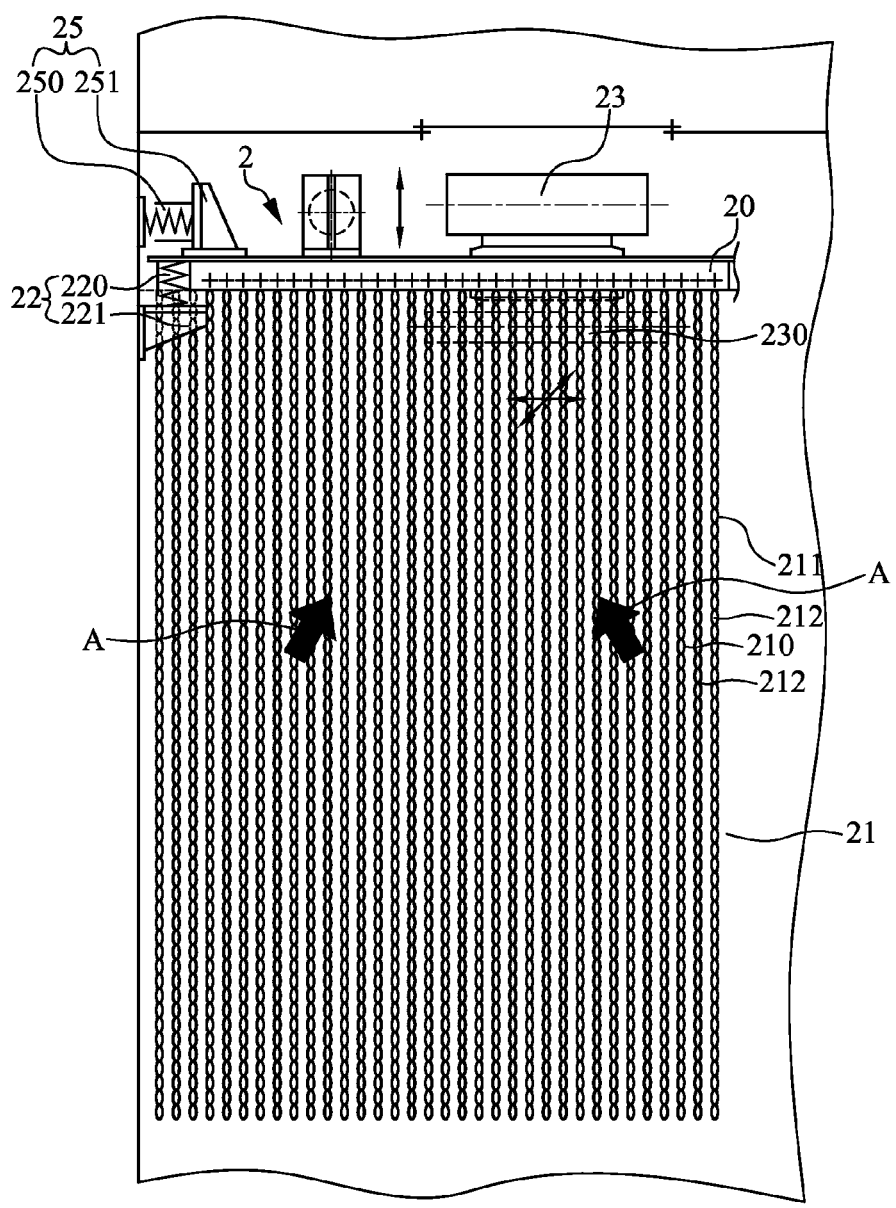
FIG. 7 is a schematic diagram showing the gas distributor of the fifth embodiment.

Please refer to FIG. 6 and FIG. 7, which are schematic diagrams showing the gas distributor of the fifth embodiment. In this embodiment, there are a plurality of second dampers 25 being disposed at the top of the support 20 while simultaneously there are a plurality of first dampers 22 being disposed at the bottom of the support 20, and also in addition to the vibrator 23 that is arranged at the top of the support 20, there is an additional vibrator 230 being arranged at the bottom of the support 20. It is noted that any one of the first dampers 22 and second dampers 25 can be an industrial damper or damper that is currently available on the market, and thus it is not restricted by those disclosed on the figures of the present invention.

As shown in FIG. 7, each second damper 25 is disposed at the top of the support 20 on a side thereof, and is composed of a second seat 251 and an elastic member 250 in a manner that the second seat 251 is mounted on the top of the support 20; and an end of the elastic member 250 is engaged to the second seat 251 while another end of the elastic member 250 is abut against the inner wall of the gas distributor wherein the inner wall is the wall formed inside the interior of gas distributor.

In FIG. 7, the vibrator 230 that is arranged at the bottom of the support 20 is disposed behind the first flow-distributing curtain 21 with respect to the inflow of the dust-containing gas flow A, and is being used for enabling the first flow-distributing curtain 21 to vibrate transversely in a direction vertical to the inflow of the dust-containing gas flow A.

Figure 8:
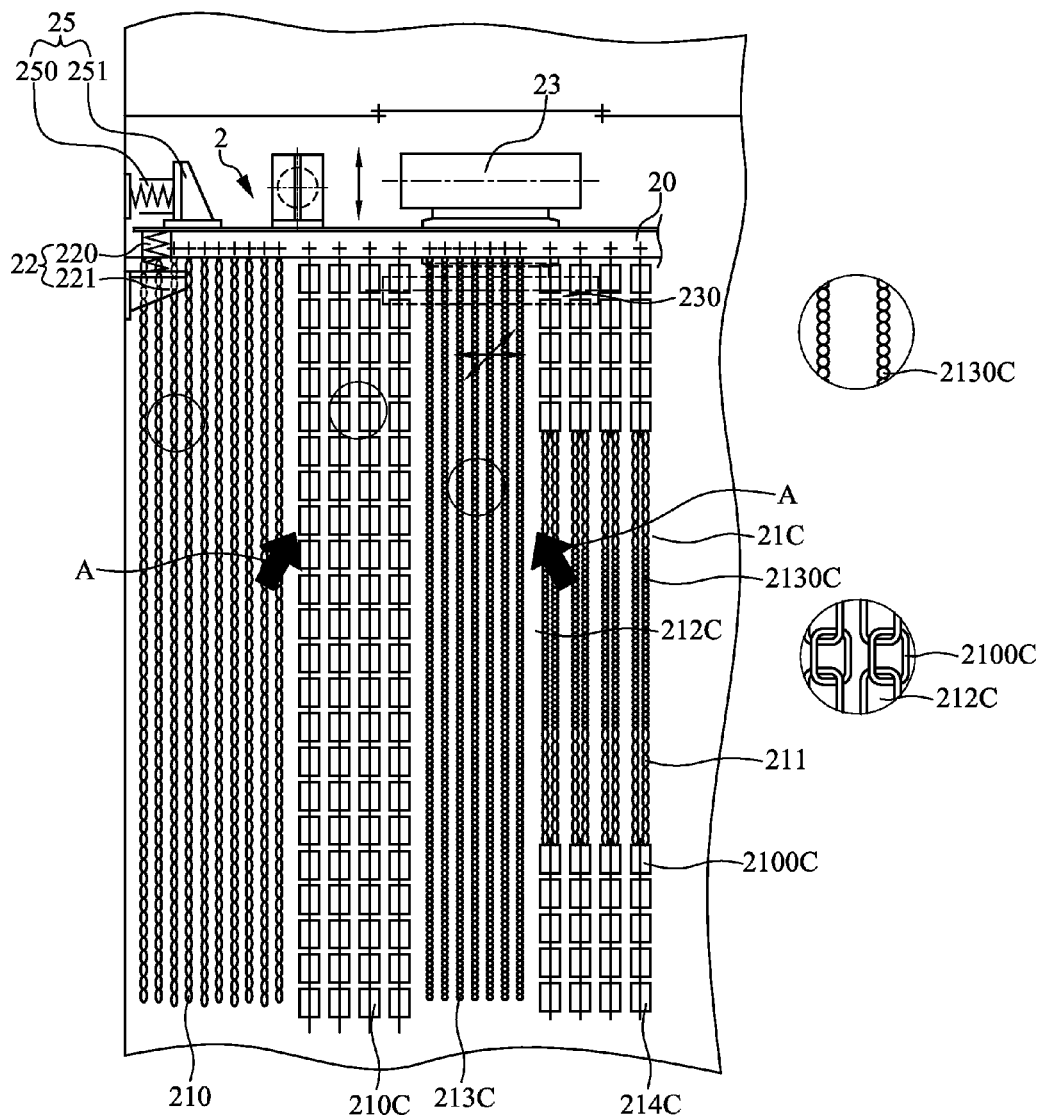
FIG. 8 is a schematic diagram showing a gas distributor for a granular moving-bed filter according to a sixth embodiment of the invention.

Please refer to FIG. 8, which is a schematic diagram showing a gas distributor for a granular moving-bed filter according to a sixth embodiment of the invention. In this embodiment, the flow-distributing curtain 21C is composed of a plurality of chains 210, 210C, a plurality of bead-chains 213C, and a plurality of compound chains 214C while allowing the plurality of chains 210, 210C, the plurality of bead-chains 213C and the plurality of compound chains 214C to be arranged in aligned or staggered array. For example, in an aligned array shown in FIG. 8, the plurality of chains 210, 210C, the plurality of bead-chains 213C and the plurality of compound chains 214C are aligned one after another. In alternatively arranged example, the plurality of chains 210, 210C, the plurality of bead-chains 213C and the plurality of compound chains 214C are respectively divided into a plurality of chain groups, a plurality of bead-chain groups and a plurality of compound chain groups while allowing each chain group to contain at least one chain 210, 210C, each bead-chain group to contain at least one bead-chain 213C and each compound chain group to contain at least one compound chain 214C, and thus enabling the plurality of chain groups, the plurality of bead-chain groups and the plurality of compound chain groups to be arranged in staggered array manner. In addition, each chain of the plurality of chains 210, 210C is composed of a plurality of serially connected links, and each link, being an object selected from the group consisting of: a circular object 211 and a rectangle object 2100C, has one flow-through area 212C formed therein. Moreover, each bead-chain 213C is composed of a plurality of serially connected beads 2130C; and each compound chain 214C is composed of a plurality of circular objects 211, a plurality of beads 2130C and a plurality of rectangle objects 2100C that are serially connected to one another. It is noted that each of the at least one flow-through area 212C is substantially formed between the chains 210, 210C, the plurality of bead-chains 213C and the plurality of compound chains 214C.

Figure 9:
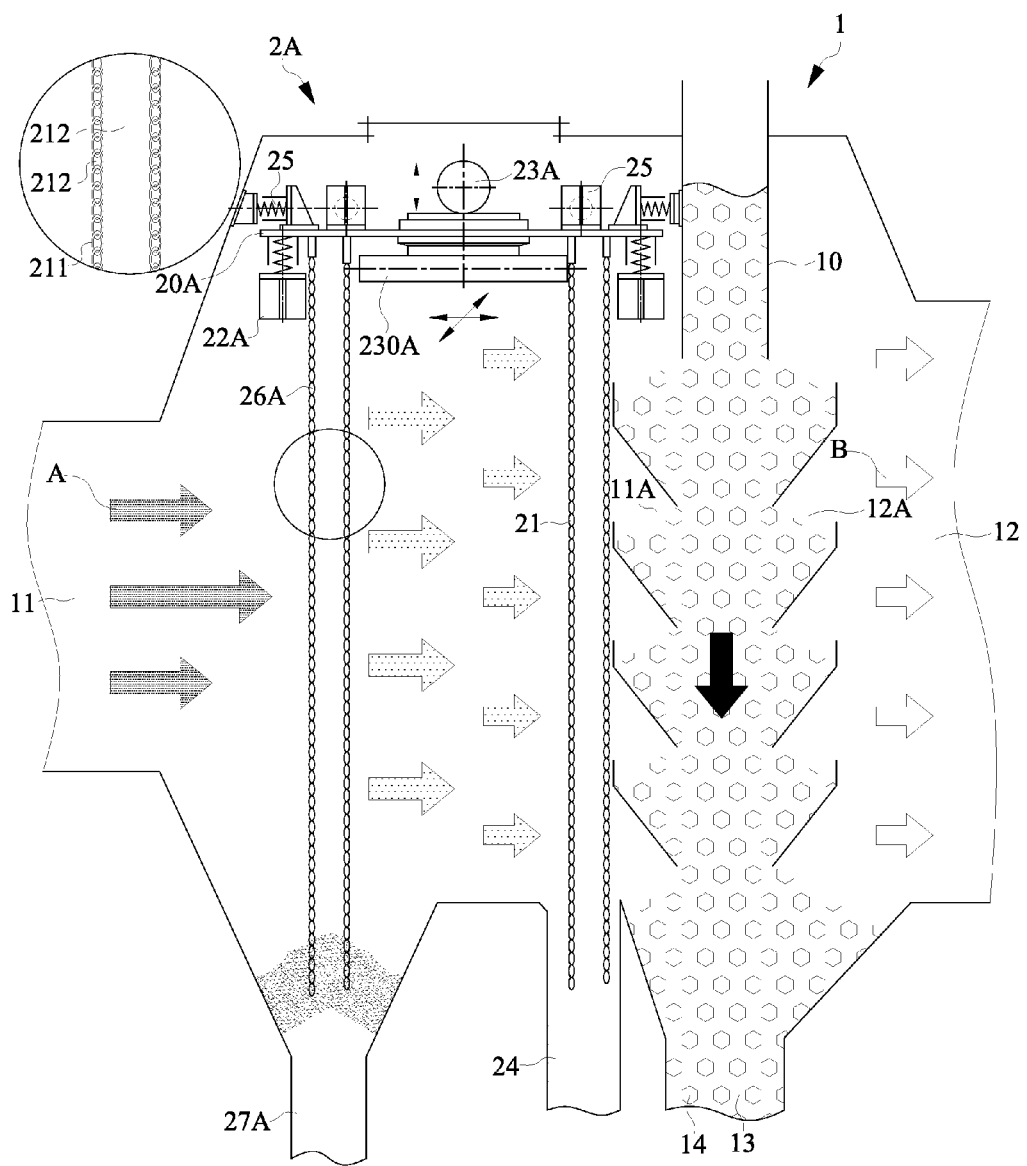
FIG. 9 is a schematic diagram showing a gas distributor for a granular moving-bed filter according to a seventh embodiment of the invention.

Please refer to FIG. 9, which is a schematic diagram showing a gas distributor for a granular moving-bed filter according to a seventh embodiment of the invention. The gas distributor of the seventh embodiment is featured in that: in addition to the first flow-distributing curtain 21 and the first dust hopper 24, the distribution module 2A further has at least one second flow-distributing curtain 26A and a second dust hopper 27A. It is noted that there can be multiple first flow-distributing curtains 21 and multiple second flow-distributing curtains 26A being arranged in the distribution module 2A, wherein at least two of those first flow-distributing curtains 21 to be arranged parallel with each other, and at least two of those second flow-distributing curtains 26A to be arranged parallel with each other. In this embodiment, each of the first and second flow-distributing curtains 21, 26A is fixed to the bottom of the support 20A while each first flow-distributing curtain 21 is disposed corresponding to each second flow-distributing curtain 26A. As shown in FIG. 9, each first flow-distributing curtain 21 is arranged adjacent to the inlet 11A, and at least one second damper 25 is arranged at a side of the top of the support 25 and at least one first damper 20A is arranged at a side of the bottom of the support 25. Moreover, the vibrator 230A that is arranged at the bottom of the support 20A is disposed at a position between the first flow-distributing curtain 21 and the second flow-distributing curtain 26A. It is noted that the structure of each of the second damper 25, the first damper 22A, the first flow-distributing curtain 21 and the second flow-distributing curtain 26A is the same as those disclosed in the previous embodiments, and thus is not described further herein.

In FIG. 9, since there will be at least two of those first flow-distributing curtains 21 to be arranged parallel with each other, the flow-through areas 212 formed inside the links 211 of any two first flow-distributing curtains 21 are parallel and alternatively arranged with respect to each other, while the second flow-distributing curtains 26A can also be arranged in the same manner. Besides, in addition to the first dust hopper 24 that is arranged beneath the first flow-distributing curtain 21, there is a second dust hopper 27A being arranged beneath the second flow-distributing curtain 26A.

Figure 10:
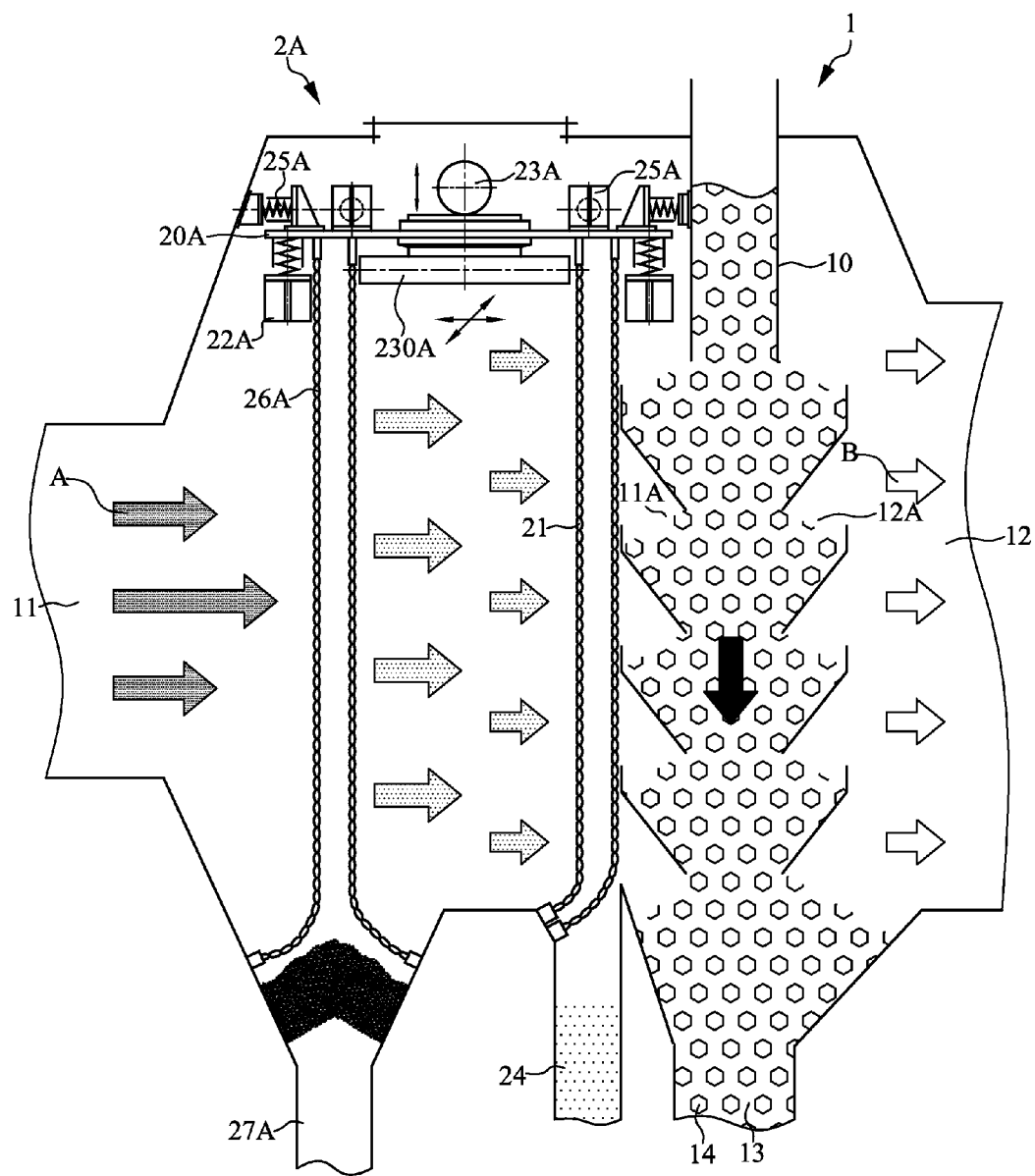
FIG. 10 is a schematic diagram showing a gas distributor for a granular moving-bed filter according to an eighth embodiment of the invention.

Please refer to FIG. 10, which is a schematic diagram showing a gas distributor for a granular moving-bed filter according to an eighth embodiment of the invention. In FIG. 10, the tail of the first flow-distributing curtain 21 is connected to the first dust hopper 24 while the tail of the second flow-distributing curtain 26A is connected to the second dust hopper 27A.

Figure 11:
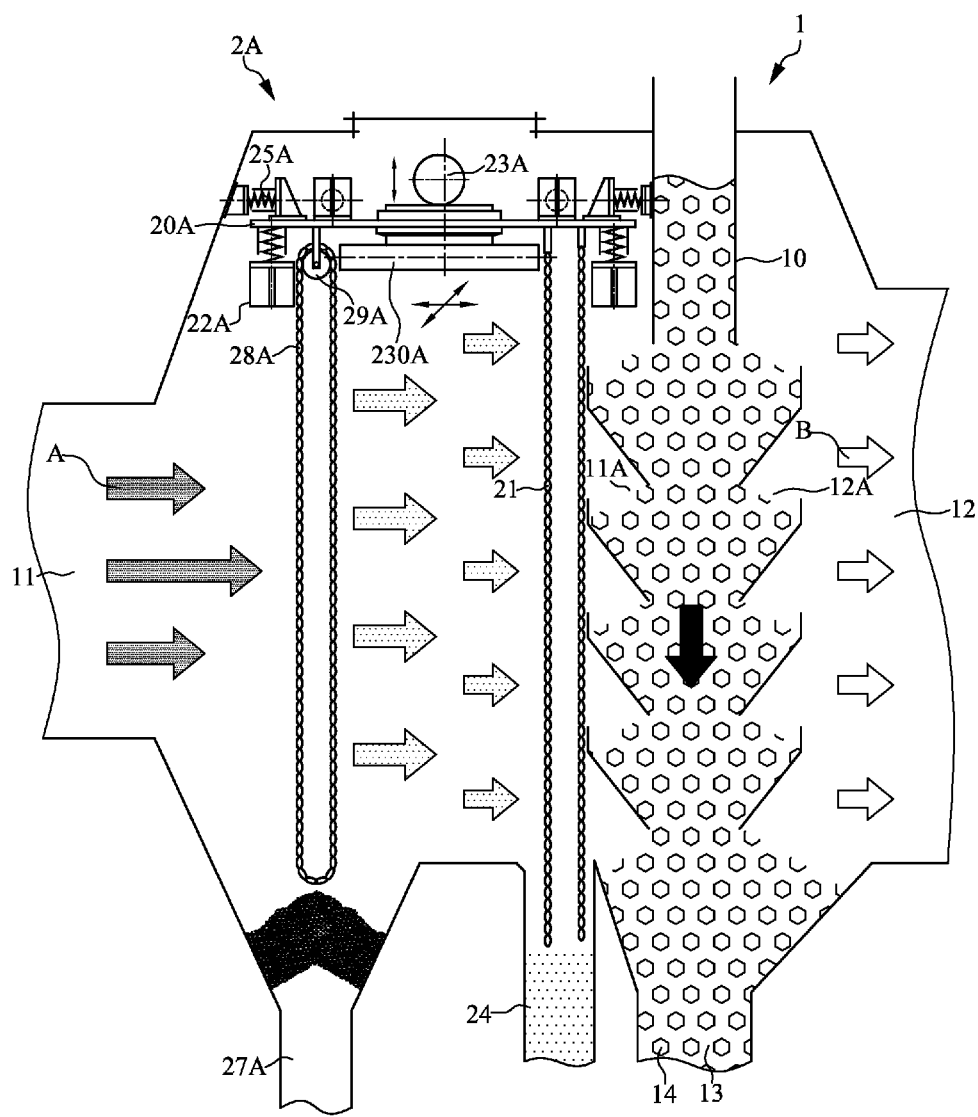
FIG. 11 is a schematic diagram showing a gas distributor for a granular moving-bed filter according to a ninth embodiment of the invention.

Please refer to FIG. 11, which is a schematic diagram showing a gas distributor for a granular moving-bed filter according to a ninth embodiment of the invention. In this embodiment, at least one of the second flow-distributing curtains 28A comprises at least one loop-like chains, while allowing each of the loop-like chains to be wound around at least one second top roller 29A that is disposed at the bottom of the support 20A. As shown in FIG. 11, the second top roller 29A can be driven to rotate by a power device and thus drives the second flow-distributing curtain 28A accordingly.

Figure 12:
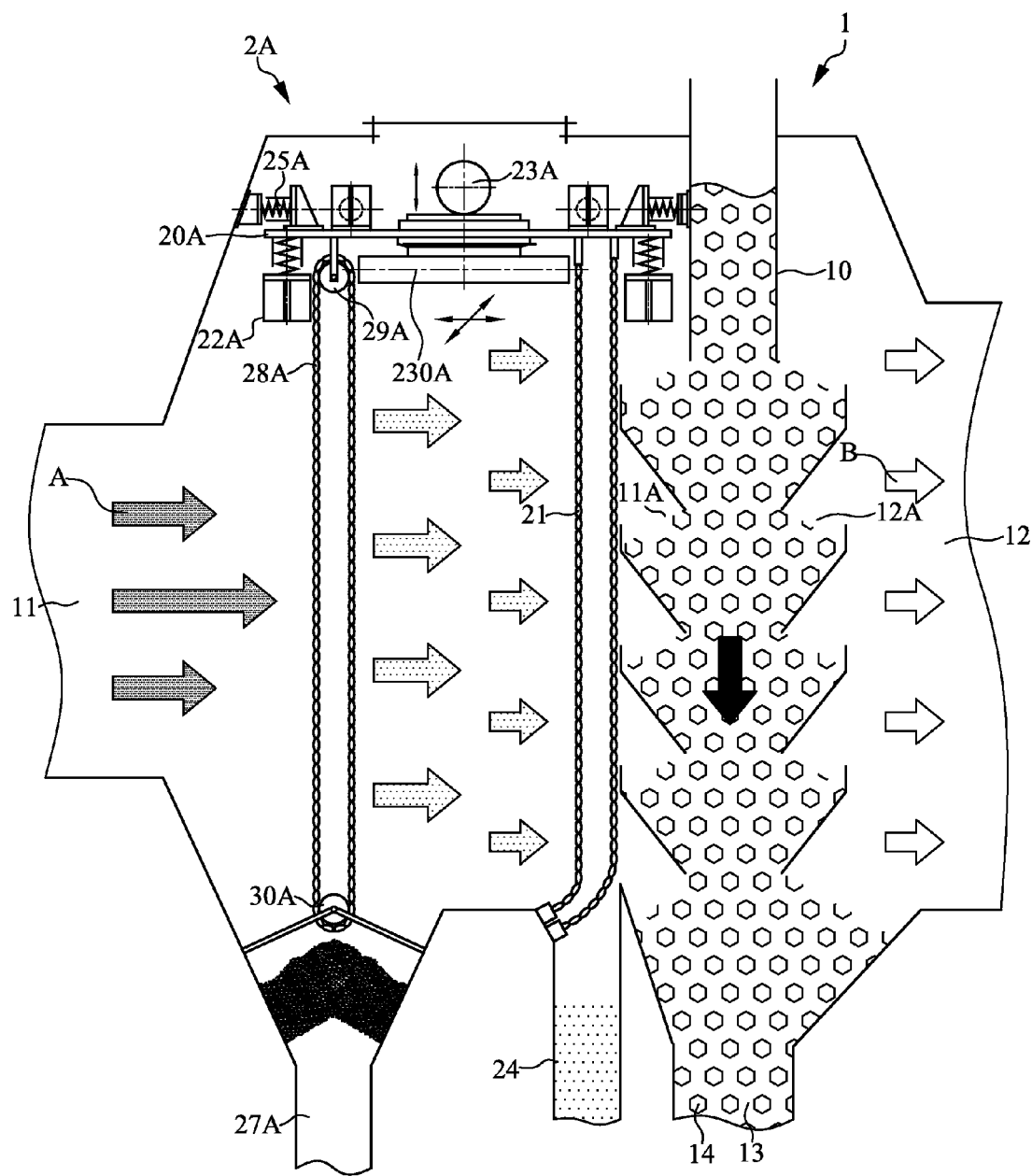
FIG. 12 is a schematic diagram showing a gas distributor for a granular moving-bed filter according to a tenth embodiment of the invention.

Please refer to FIG. 12, which is a schematic diagram showing a gas distributor for a granular moving-bed filter according to a tenth embodiment of the invention. The tenth embodiment is designed based upon the ninth embodiment of the invention, but one step further, the tails of the first flow-distributing curtains 21 are fixed to the first dust hopper 24, and the second flow-distributing curtains 28A are wound around the second top roller 29A and an additional second bottom roller 30A mounted on the second dust hopper 27A.

Figure 13:
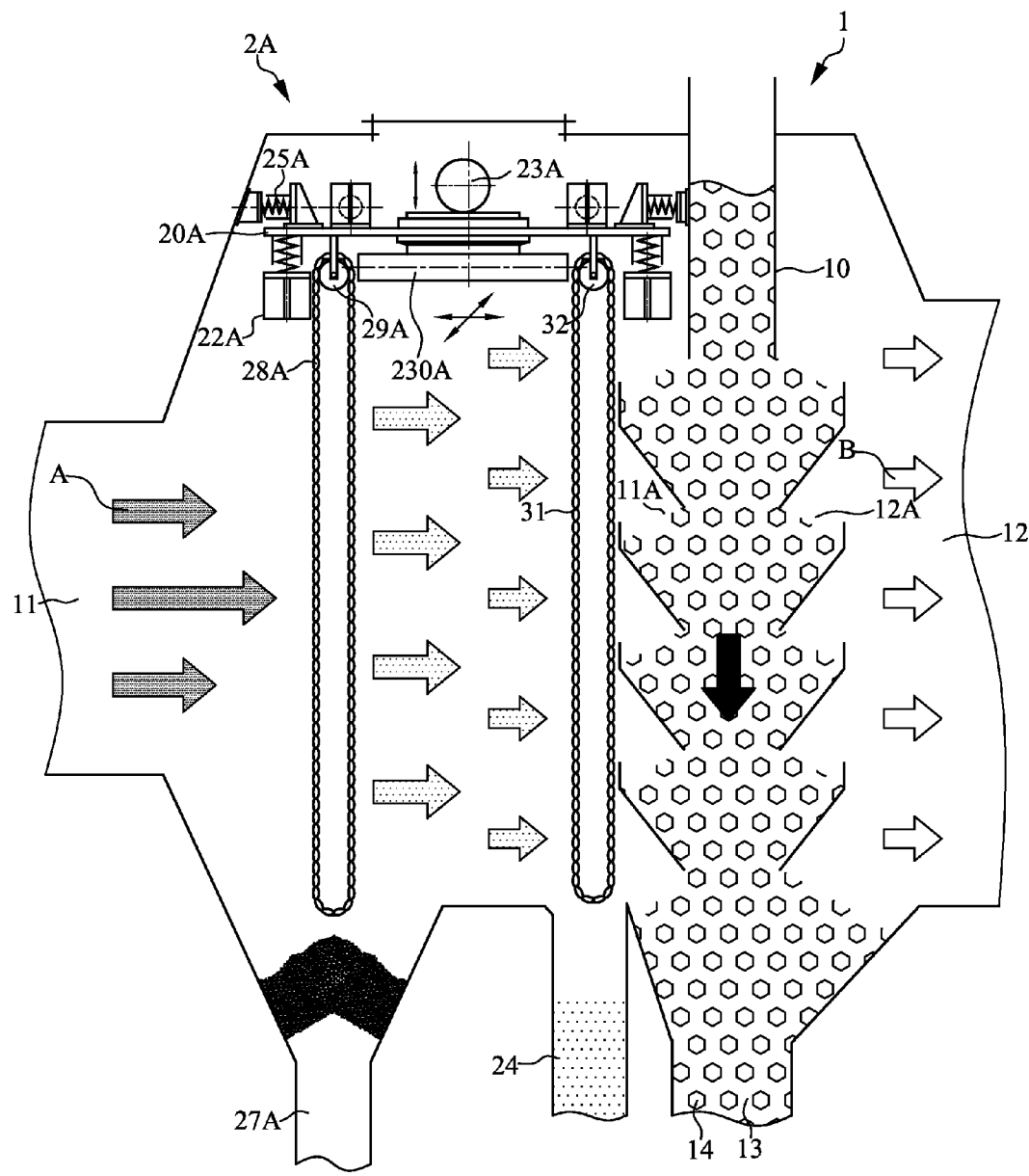
FIG. 13 is a schematic diagram showing a gas distributor for a granular moving-bed filter according to an eleventh embodiment of the invention.

Please refer to FIG. 13, which is a schematic diagram showing a gas distributor for a granular moving-bed filter according to an eleventh embodiment of the invention. Similarly, there is at least one of the first flow-distributing curtains 31 comprising at least one loop-like chains, while allowing each of the loop-like chains to be wound around at least one first top roller 32 that is disposed at the bottom of the support 20A. As shown in FIG. 13, the first top roller 32 can be driven to rotate by a power device and thus drives the first flow-distributing curtain 31 accordingly.

Figure 14:
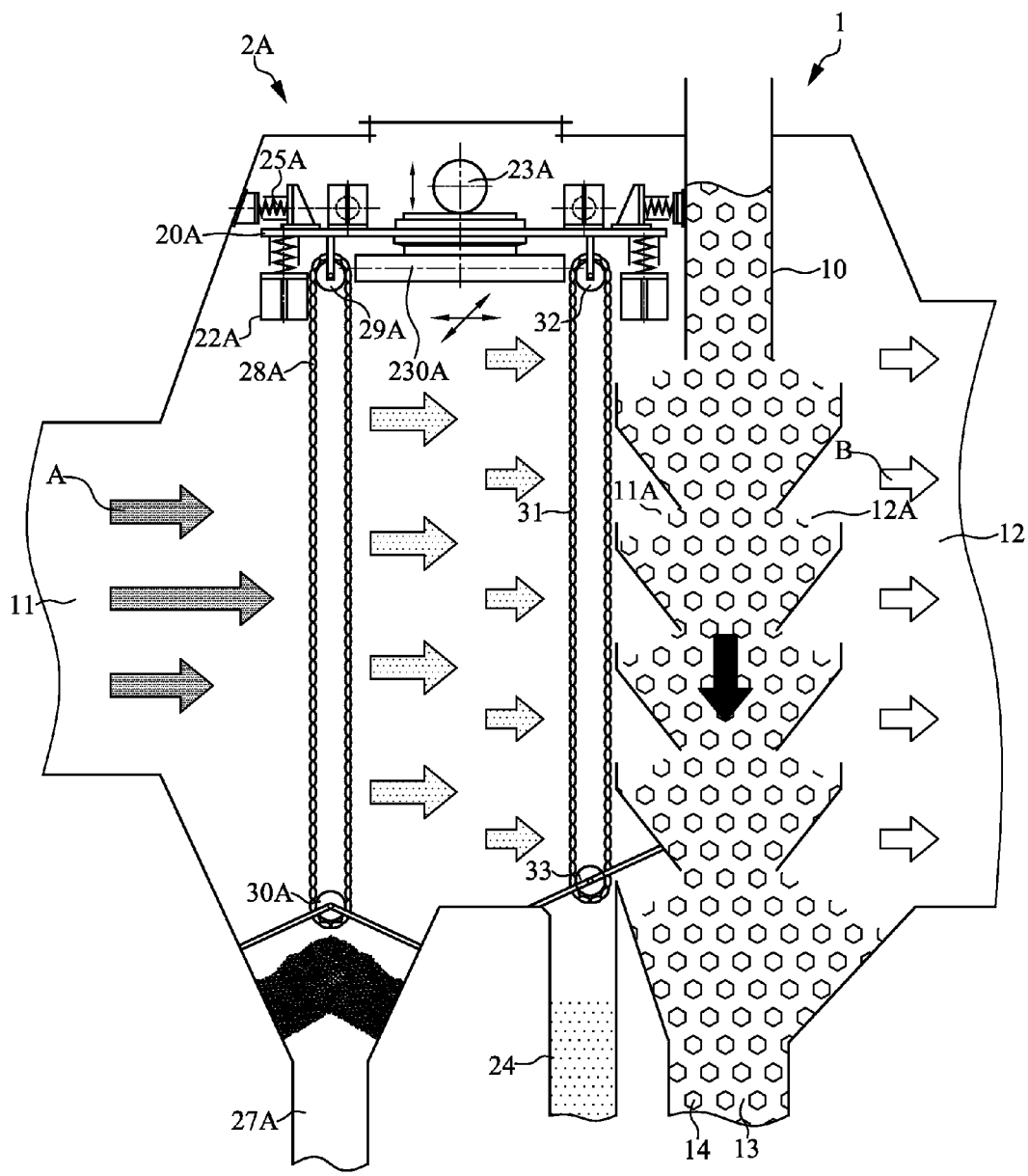
FIG. 14 is a schematic diagram showing a gas distributor for a granular moving-bed filter according to a twelfth embodiment of the invention.

Please refer to FIG. 14, which is a schematic diagram showing a gas distributor for a granular moving-bed filter according to a twelfth embodiment of the invention. As the twelfth embodiment is designed based upon the eleventh embodiment of the invention, but one step further, the gas distributor will further have its first flow-distributing curtains 31 to be wound around its first top roller 32 and an addition first bottom roller 33 mounted on the first dust hopper 24 while the second flow-distributing curtains 28A are wound around its second top roller 29A and an additional second bottom roller 30A. In one embodiment, the top roller 29A, 32 and the bottom roller 30A, 33 are simultaneously driven to rotate by the power device. In an alternative embodiment, it is appreciated that only the top rollers 29A, 32 or the bottom rollers 30A, 33 are selected to be driven to rotate by the power device.

As shown in FIG. 1, FIG. 5, FIG. 9~FIG. 14, either the turbulent and dust-containing gas flow A is enabled to flow through the first flow-distributing curtain 21, or the turbulent and dust-containing gas flow A is enabled to pass sequentially through the second flow-distributing curtains 26A, 28A and the first flow-distributing curtains 21, 31, the turbulent and dust-containing gas flow A will be obstructed and guided by those flow-distributing curtains 21, 26A, 28A, 31 such that the turbulent and dust-containing gas flow A can be converted into a more uniformly distributed gas flow passing through the flow-through areas 212, 212A, 212B and 212C, whereby the majority of the dust containing in the gas flow A will be gathered and concentrated at the flow-through areas 212, 212A, 212B and 212C as well as on those curtains 21, 26A, 28A, 31 so that the flow-distributing curtains 21, 26A, 28A, 31 are substantially working as filtration devices. After the flow-distributing curtains 21, 26A, 28A, 31 filter the turbulent and dust-containing gas flow A for a period of time, the flow-distributing curtains 21, 26A, 28A, 31 will be induced to vibrate transversely and longitudinally by the use of the vibrator 23, 230, 23A, 230A so as to strip off the dust attached on flow-distributing curtains 21, 26A, 28A, 31 and thus the dust can fall into the dust hoppers 24, 27A that can be cleaned later. Consequently, by the aforesaid vibration mechanism, the distribution module 2, 2A can be cleaned efficiently and rapidly without stopping the operation of the distribution module when the flow-distributing curtains are clogged by dust.

In addition, the vibrators 23, 230, 23A, 230A can prevent the flow-through areas 212, 212A, 212B, and 212C from being clogged by the massive dust such that the turbulent and dust-containing gas flow A can be kept to flow through the flow-distributing curtains 21, 26A, 28A, 31 smoothly.

On the other hand, by the arrangement of the dampers 22, 22A, and 25A, the distribution module 2, 2A can be prevented from hitting the granular moving-bed filter 1 or hitting the inner walls defined the accommodation space in which the distribution module 2, 2A are disposed when the vibrators 23, 230, 23A, 230A are actuated, whereby the distribution module 2, 2A or the granular moving-bed filter 1 can be kept from being damaged.

After the gas flow A is enabled to flow into the granular moving-bed filter 1 through the inlet 11, the dust or contaminants that are still remained in the gas flow A will further be filtered by the filter granules 14. After the gas flow A passes through filter granules 14, the gas flow A is cleaned and becoming a clean gas flow B that can be discharged out of the granular moving-bed filter 1 from the outlet 12.

To sum up, by the at least one flow-distributing curtain, the gas distributor of the present invention can be used for allowing a turbulent and dust-containing gas flow A to flow therethrough, resulting that, before the gas flow A enters the granular moving-bed filter, the turbulent gas is transformed into a more uniformly distributed gas flow while the dust contained therein is filtered out in advance by the flow-distributing curtain, thereby preventing dust or contaminants from being concentratedly deposited at certain inlets of the granular moving-bed filter and eventually clogging the inlets of the granular moving-bed filter.

In addition, by the arrangement of more than one flow-distributing curtains while keeping their flow-through areas to be disposed alternatively, not only can the turbulent and dust-containing gas flow A be enabled to distribute more uniformly, but also the filtration efficiency of those flow-distributing curtains to the dust-containing gas flow A can further be improved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A gas distributor, adapted for a granular moving-bed filter having an inlet disposed at a side thereof and an outlet disposed at another side thereof, comprising a distribution module, comprising:
a support, comprising a top and a bottom, mounted on the granular moving-bed filter at a position close to the inlet;
a first flow-distributing curtain, comprising at least one first flow-through area, to be arranged at the bottom of the support;
at least one first damper, arranged on at least one side of the bottom of the support;

at least one second damper, arranged on at least one side of the top of the support;

a first vibrator, disposed at the top of the support;

a second vibrator, arranged at the bottom of the support and a first dust hopper, arranged beneath the first flow-distributing curtain.

2. The gas distributor of claim 1, wherein the distribution module is further configured with a second flow-distributing curtain corresponding to the first flow-distributing curtain and a second dust hopper, wherein the second flow-distributing curtain comprises at least one second flow-through area and is arranged at the bottom of the support while the second dust hopper is arranged beneath the second flow-distributing curtain.

3. The gas distributor of claim 2, wherein each first flow-distributing curtain or each second flow-distributing curtain is composed of a plurality of chains and each 30 chain is composed of a plurality of serially connected links, while each link has a hollow part for forming one of the at least one first or second flow-through area as well as each gap formed between any two neighboring chains forms the first or the second flow-through area.

4. The gas distributor of claim 2, wherein each first flow-distributing curtain or each second flow-distributing curtain is composed of a plurality of ropes while each gap formed between any two neighboring ropes forms one of the at least one first or second flow-through area.

5. The gas distributor of claim 2, wherein each first flow-distributing curtain or each second flow-distributing curtain is composed of a plurality of bar-like elements while each gap formed between any two neighboring bar-like elements forms one of the at least one first or second flow-through area, and each bar-like element is an object selected from the group consisting of: a long strip-like object, a rod-like object, a long strip-like object with geometrical shape, or a rod-like object with geometrical shape.

6. The gas distributor of claim 2, wherein each first flow-distributing curtain or each second flow-distributing curtain is composed of a plurality of chains, a plurality of bead-chains, and a plurality of compound chains, while the plurality of chains, the plurality of bead-chains, and the plurality of compound chains are arranged in aligned or staggered array, or at least a chain, a bead-chain and a compound chain are staggered, while the space in between accommodates the first or second flow through areas.

7. The gas distributor of claim 6, wherein each chain is composed of a plurality of serially connected links respectively having one first or second flow-through area formed therein, and each link can be selected from a circular or a rectangle object; each bead-chain is composed of a plurality of serially connected beads; and each compound chain is composed of a plurality of circular objects, a plurality of beads and a plurality of rectangle objects that are serially connected to one another.

8. The gas distributor of claim 1, wherein the bottom of the first flow-distributing curtain is connected to the first dust hopper.

9. The gas distributor of claim 2, wherein the first flow-distributing curtain and the second flow-distributing curtain are parallel to each other.

10. The gas distributor of claim 9, wherein the first flow-through area of the first flow-distributing curtain is arranged in a parallel and staggered manner with respect to the second flow-through area of the second flow-distributing curtain.

11. The gas distributor of claim 1 wherein the first flow-distributing curtain filters the incoming turbulent and dust-containing gas flow and improves the uniformity of gas flow; and the vibrator shakes the first flow-distributing curtain to strip off dust attached on so that the dust falls into the dust hopper consequently.

12. The gas distributor of claim 1, further comprising an adjusting rod that is coupled to the first flow-distributing curtain.

13. The gas distributor of claim 2, wherein the first flow-distributing curtain or the second flow-distributing curtain is composed of a plurality of loop-like chains, while allowing the loop-like chains to be wound around at least one top roller that is disposed at the bottom of the support.

14. The gas distributor of claim 13, wherein the first dust hopper or the second dust hopper is further configured with a bottom roller and the loop-like chains forming the first flow-distributing curtain or the second flow-distributing curtain are wound around the bottom roller.

15. The gas distributor of claim 14, wherein the top roller and the bottom roller are simultaneously driven to rotate by a power device.

16. The gas distributor of claim 14, wherein either the top roller or the bottom roller is driven to rotate by a power device.

* * * * *